United States Patent
Xu et al.

(10) Patent No.: US 11,194,692 B2
(45) Date of Patent: Dec. 7, 2021

(54) LOG-BASED SYSTEM MAINTENANCE AND MANAGEMENT

(71) Applicant: NEC Laboratories America, Inc., Princeton, NJ (US)

(72) Inventors: Jianwu Xu, Titusville, NJ (US); Hui Zhang, Princeton Junction, NJ (US); Haifeng Chen, West Windsor, NJ (US); Bin Nie, Williamsburg, VA (US)

(73) Assignee: NEC Corporation

( * ) Notice: Subject to any disclaimer, the term of this patent is extended or adjusted under 35 U.S.C. 154(b) by 733 days.

(21) Appl. No.: 16/037,354

(22) Filed: Jul. 17, 2018

(65) Prior Publication Data

US 2019/0095313 A1    Mar. 28, 2019

Related U.S. Application Data

(60) Provisional application No. 62/561,856, filed on Sep. 22, 2017.

(51) Int. Cl.
*G06F 11/34* (2006.01)
*G06F 11/00* (2006.01)
(Continued)

(52) U.S. Cl.
CPC ........ *G06F 11/3476* (2013.01); *G06F 11/006* (2013.01); *G06F 11/008* (2013.01); *G06F 11/3447* (2013.01); *G06F 16/313* (2019.01); *G06F 17/18* (2013.01); *G06K 9/6232* (2013.01); *G06K 9/6282* (2013.01); *G06K 9/6284* (2013.01); *G06N 3/049* (2013.01); *G06N 20/00* (2019.01); *G06F 16/35* (2019.01); *G06F 2201/86* (2013.01); *G06N 5/045* (2013.01)

(58) Field of Classification Search
None
See application file for complete search history.

(56) References Cited

U.S. PATENT DOCUMENTS 9,990,639 B1 * 6/2018 Kong .................... G06Q 50/16
2015/0089309 A1   3/2015 Fu et al.
(Continued)

FOREIGN PATENT DOCUMENTS

CN         106603293 A  *  4/2017

OTHER PUBLICATIONS

Kimura et al., "Proactive Failure Detection Learning Generation Patterns of Large-scale Network Logs" 2015 IFIP (Year: 2015).*
(Continued)

*Primary Examiner* — John C Kuan
(74) *Attorney, Agent, or Firm* — Joseph Kolodka

(57) ABSTRACT

Methods and systems for system maintenance include identifying patterns in heterogeneous logs. Predictive features are extracted from a set of input logs based on the identified patterns. It is determined that the predictive features indicate a future system failure using a first model. A second model is trained, based on a target sample from the predictive features and based on weights associated with a distance between the target sample and a set of samples from the predictive features, to identify one or more parameters of the second model associated with the future system failure. A system maintenance action is performed in accordance with the identified one or more parameters.

20 Claims, 7 Drawing Sheets

(51) Int. Cl.
G06K 9/62 (2006.01)
G06F 16/35 (2019.01)
G06F 17/18 (2006.01)
G06N 3/04 (2006.01)
G06N 20/00 (2019.01)
G06F 16/31 (2019.01)
G06N 5/04 (2006.01)

(56) References Cited

U.S. PATENT DOCUMENTS

2015/0227838 A1   8/2015   Wang et al.
2017/0213280 A1*  7/2017   Kaznady ............. G06N 20/20
2018/0060314 A1   3/2018   Xu et al.

OTHER PUBLICATIONS

Wang et al., "Predictive maintenance based on event-log analysis: A case study" IBM J. Res. & Dev. vol. 61 No. 1 Paper 11 Jan./Feb. 2017 (Year: 2017).*

Vinayakumar R et al., "Long Short-Term Memory based Operation Log Anomaly Detection" IEEE 2017 (Year: 2017).*

Reidemeister et al., "Mining Unstructured Log Files for Recurrent Fault Diagnosis" 12th IFIP/IEEE IM 2011: Mini Conference (Year: 2011).*

Hossein Hamooni et al., LogMine: Fast Pattern Recognition for Log Analytics. Proceedings of the 25th ACM International Conference on Information and Knowledge Management. ACM, Oct. 2016.

Xia Ning et al., HLAer: A System for Heterogeneous Log Analysis. SDM Workshop on Heterogeneous Learning, Apr. 2014.

Marco Tulio Ribeiro et al., Why should I trust you?: Explaining the predictions of any classifier. Proceedings of the 22nd ACM SIGKDD International Conference on Knowledge Discovery and Data Mining. ACM, Feb. 2016.

Ruben Sipos et al., Log-based predictive maintenance. In Proceedings of the 20th ACM SIGKDD international conference on knowledge discovery and data mining, pp. 1867-1876. ACM, Aug. 2014.

T.F. Smith et al., Identification of common molecular subsequences, Journal of molecular biology, vol. 147, No. 1, pp. 195-197, Mar. 1981.

Ke Zhang et al., Automated IT system failure prediction: A deep learning approach. 2016 IEEE International Conference on Big Data (Big Data), Washington, DC. Dec. 2016.

* cited by examiner

LOG-BASED SYSTEM MAINTENANCE AND MANAGEMENT

This application claims priority to U.S. Patent Application No. 62/561,856, filed on Sep. 22, 2017, incorporated herein by reference herein its entirety.

BACKGROUND

Technical Field

The present invention relates to system log analysis and, more particularly, to the analysis and interpretation of heterogeneous logs to predict failures in complex computer systems.

Description of the Related Art

Heterogeneous operational logs serve as inexpensive sensors in computer systems, which record and indicate the health status of such systems. Traditional monitoring relies on manually reviewing the logs, which is both labor-intensive and post hoc, providing insight only after something goes wrong. While automation of this process using text mining has been attempted, most such solutions provide analyses in a high-dimensional space as a result of the large number of text keywords, making them vulnerable to noise.

SUMMARY

A method for system maintenance include identifying patterns in heterogeneous logs. Predictive features are extracted from a set of input logs based on the identified patterns. It is determined that the predictive features indicate a future system failure using a first model. A second model is trained, based on a target sample from the predictive features and based on weights associated with a distance between the target sample and a set of samples from the predictive features, to identify one or more parameters of the second model associated with the future system failure. A system maintenance action is performed in accordance with the identified one or more parameters.

A method for system maintenance includes identifying patterns in heterogeneous logs by clustering the heterogeneous logs according to similarity. Predictive features are extracted from a set of input logs based on the identified patterns by converting pattern distribution features according to Term-Frequency Inverse-Document-Frequency. It is determined that the predictive features indicate a future system failure using a first model that averages an output of two distinct machine learning models. A second model is trained, based on a target sample from the predictive features and based on weights associated with a distance between the target sample and a set of samples from the predictive features, to identify one or more parameters of the second model associated with the future system failure. A system maintenance action is performed in accordance with the identified one or more parameters.

A system for system maintenance includes a log pattern module configured to identify patterns in heterogeneous logs. A feature extraction module is configured to extract predictive features from a set of input logs based on the identified patterns. A failure prediction module is configured to determine that the predictive features indicate a future system failure using a first model. An interpretation module is configured to train a second model, based on a target sample from the predictive features and based on weights associated with a distance between the target sample and a set of samples from the predictive features, to identify one or more parameters of the second model associated with the future system failure. A maintenance module is configured to perform a system maintenance action in accordance with the identified one or more parameters.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention extract low-dimensional features from a large set of heterogeneous logs to provide early warning signals for future system failures. The present embodiments furthermore provide semantically meaningful interpretations of the predictions to assist users in determining whether the failure prediction results should be trusted as well as to identify potential causes for the predicted failure to aid in system maintenance.

Toward that end, the present embodiments make use of multiple different machine learning models. In one embodiment, a deep learning model and an ensemble tree-based model are used in tandem to predict failure events. The present embodiments then use, for example, a surrogate model to interpret system failure prediction results. Such a surrogate model trains a sparse L1-regularized linear model on selected, close-by samples to deliver local-faithful explanations.

Figure 1:
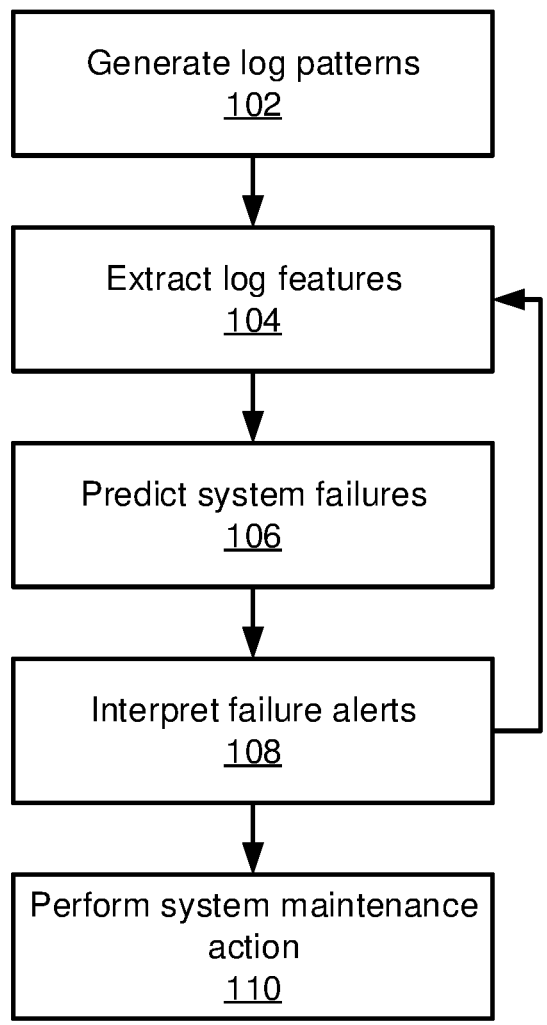
FIG. 1 is a block/flow diagram of a method for performing automated system maintenance based on heterogeneous logs in accordance with an embodiment of the present invention.

Referring now to FIG. 1, a method for log predictive analytics is shown. Block 102 clusters a set of input heterogeneous log files according to similarity in log format and generates pattern templates for each cluster of logs. These pattern templates are stored and updated as needed. Block 102 matches logs with corresponding pattern templates. Generation of log patterns in block 102 may be performed as an automated process using unsupervised clustering and pattern recognition, without any human input.

Given a series of matched patterns, block 104 performs log feature extraction, discretizing the continuous time dimension into time bins and calculating the log counts for each log pattern in every time bin. Block 104 then applies Term-Frequency Inverse-Document-Frequency (TF-IDF) on the log pattern counts. An optional dimensionality reduction is provided as well to remove redundant log patterns, thus speeding up downstream prediction and analysis processes.

Block 106 predicts system failures using the TF-IDF-converted log pattern counts. At least two machine models are used. In one exemplary embodiment, a first machine learning model is a long-short-term memory (LSTM) recurrent neural network that captures long-term temporal dependencies in a time series, while a second machine learning model is a gradient-boosting decision tree (GBDT) that produces moderate performance on most problems. It should be understood that, while these two specific machine learning models are contemplated, other models may be used instead of, or in addition to, the LSTM and GBDT models. Failure prediction 106 provides one or more failure alerts as an output that include the timestamp and probability of predicted system failures.

Block 108 interprets the failure alerts. Some embodiments leverage a local-faithful surrogate model to explain the failure alerts, providing semantic information insights on the cause of failure and identifying important log patterns. Any important failure alerts are passed to block 110, which performs a system maintenance activity to mitigate or prevent the predicted failure. Processing returns to block 104 to continue to assess the system status based on updated log information.

Figure 2:
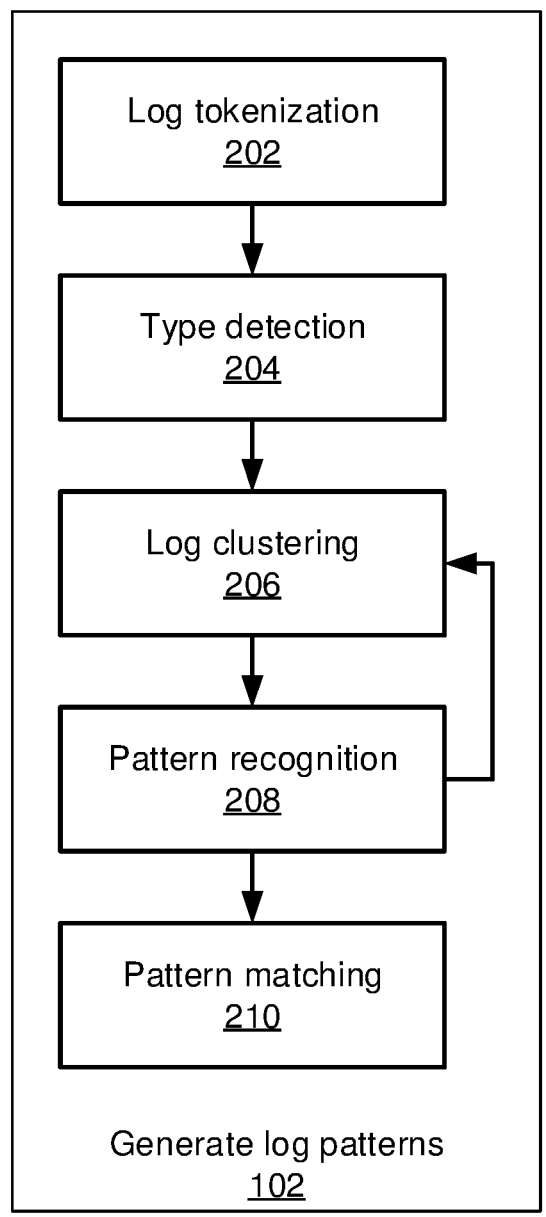
FIG. 2 is a block/flow diagram of a method for identifying patterns in heterogeneous logs in accordance with an embodiment of the present invention.

Referring now to FIG. 2, additional detail on log pattern generation 102 is shown, identifying log patterns using, for example, an automated, unsupervised learning algorithm, with a large number of heterogeneous log files as an input. In some embodiments, the temporal similarity in the time series of logs may be used to simplify the clustering problem in a sequential manner, providing good performance with low overhead.

Log tokenization 202 performs pre-processing on the logs by tokenizing every log using one or more predefined delimiters. Tokenization refers to breaking up a string according to the delimiter(s), turning the single string into multiple "tokens." Because the input logs are heterogeneous and because their formats are not necessarily known in advance, block 202 uses common delimiters, such as whitespace. Other delimiters may include, for example, commas, tabs, semicolons, and other punctuation. Users may supply their own delimiters to assist in the tokenization.

Block 204 then performs further pre-processing by identifying pre-defined data types such as, e.g., dates, times, IP addresses, and numerical values, replacing real values with placeholders such as, e.g., DATE, TIME, IP, and NUMBER. This reduces the degree of difference among heterogeneous logs to prepare for subsequent log clustering and pattern recognition.

Block 206 then clusters the logs. In some embodiments, this may be performed according to a one-pass version of friends-of-friends clustering, but it should be understood that other clustering processes may be used instead. The log clustering may then be optimized with an early abandon approach and is scalable using distributed computing. Log clustering selects a representative log to represent each cluster. Some embodiments select the first log in the cluster, though it should be understood that other selection criteria may be employed.

When considering a new long log, block 206 calculates the distance to the representative of each existing cluster and determines the best (e.g., closest distance) match. If there is no suitable cluster for the new log, for example if the best match has an above-threshold distance, then block 206 generates a new cluster represented by the new log.

Sequential clustering reduces the computational and memory costs while preserving correctness by taking advantage of the temporal dependency on time series. In practice, logs from the same application, which share similar formats and thus are clustered together, are likely to co-locate in nearby time slots. Thus, it can be helpful to input the heterogeneous logs in time-order.

Block 208 performs pattern recognition on the first-order, fine-grained, dense patterns provided by log clustering 206. Pattern recognition 208 merges clusters to obtain larger and more generic log patterns. Each merge step uses, for example, a Smith-Waterman process to align log patterns. An initial sequential merge is used, changing to unweighted pair group method with arithmetic mean when the performance sequential merge drops. A cost function is used to determine the generality of patterns and to identify the end pattern recognition procedure once the cost is within a pre-determined threshold. The final patterns output by pattern recognition 208 are stored in a global pattern set database.

Block 210 performs pattern matching once the log patterns are finalized, mapping every input log to its corresponding pattern based on, e.g., regular expression parsing. In the event that a log cannot be matched to any existing pattern, the log is treated as an anomaly and is excluded until the log pattern generation 102 is re-executed and the global pattern set database is updated to include the latest log patterns from new log sources. Pattern matching 210 may be performed concurrently with log clustering 206 and pattern recognition 208.

Figure 3:
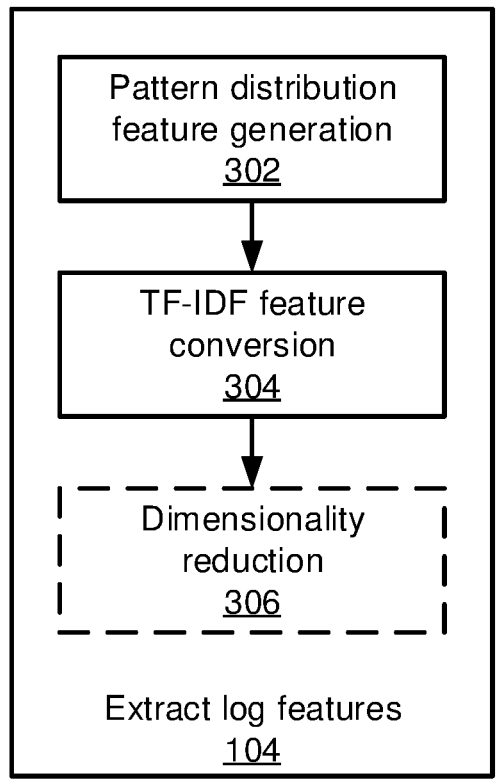
FIG. 3 is a block/flow diagram of a method for extracting predictive features from heterogeneous logs in accordance with an embodiment of the present invention.

Referring now to FIG. 3, additional detail on log feature extraction 104 is shown, which takes the output of log pattern generation 102 and generates predictive features that capture the dynamic characteristics of heterogeneous system logs. Directly using matched patterns can lead to a high-dimensional and sparse feature space. Block 104 therefore discretizes the continuous time dimension into time bins of fixed length (e.g., a fixed number of minutes).

For example, block 302 discretizes the continuous time dimension and count the number of occurrences of each pattern in each time bin. An appropriate bin size is selected, balancing the reduction in sparsity provided by large bins with the fine-grained prediction results provided by small bins. The most appropriate bin size may be selected using heuristics and domain knowledge, with an exemplary default of ten minutes.

Block 304 performs TF-IDF feature conversion. The raw log pattern count only reflects the frequency of each pattern in every time bin, without reflecting a pattern's frequency across the entire set of heterogeneous log files. Rare patterns are more helpful in recognizing failure events. Therefore, the inverse document frequency is used to give more weight to rare patterns. The TF-IDF-converted pattern counts are used as features.

Block 306 optionally performs dimensionality reduction if the number of matched patterns provided by log pattern generation 104 is too large. In such a case, the dimensionality of the feature set generated by TF-IDF conversion 304 may still be too large. Block 306 therefore reduces patterns that are, for example, less frequent and that only appear during normal operation. Other patterns co-occur with others, in which case only one of the correlated log patterns is needed. With two such reduction operations, the dimensionality can often be reduced by about 40% to about 50%.

Figure 4:
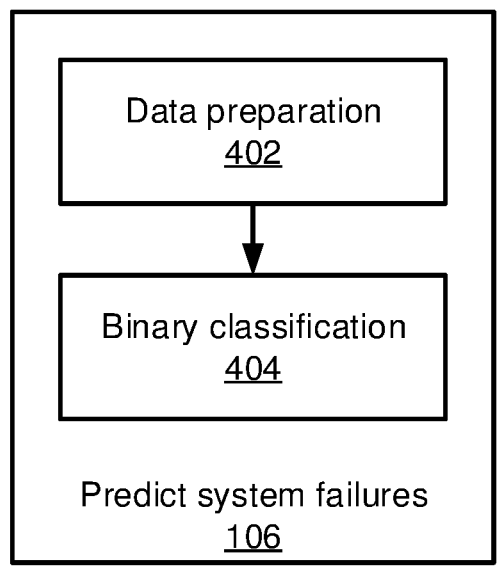
FIG. 4 is a block/flow diagram of a method for predicting system failures based on the features extracted from the heterogeneous logs in accordance with an embodiment of the present invention.

Referring now to FIG. 4, additional detail on system failure prediction 106 is shown, which takes the output of the log feature extraction 104 and generates results that predict the probability of upcoming failures for the given input of heterogeneous log files.

Some embodiments of the present invention use system failure periods that specify the start- and end-time of every system failure to train the machine learning model(s). Once the prediction model is trained and optimized, block 106 predicts whether the system is likely to fail based on unseen logs. The time period before the start of every failure period, referred to herein as the predictive period, is labeled as abnormal and is the target for failure prediction 106. Any time bin that is not in a failure period or predictive period is considered to be normal. Block 106 thus identifies time bins that belong to predictive periods among a large number of normal periods.

The present embodiments strike a balance in the length of the predictive period. A long prediction period provides earlier alerts and, thus, leaves more time for corrective action. On the other hand, the further the time bin is from the failure start time, the less useful the error-related patterns are. The predictive periods are therefore implemented with a fine-grained length, with an exemplary default length of about three hours, advised by domain knowledge, but this value can be changed for different predictive periods.

The system failure periods may be supplied by a user, with the data preparation block 402 partitioning the training data into two categories. A first category covers the system failure periods, while a second category covers normal periods. After this partition, block 402 further splits the categories into small time bins of, for example, ten minutes each. Each time bin is provided to binary classification as training samples.

During the failure periods, the monitored system may be inaccessible or may have limited functionality. Thus, the time bins for logs recorded during failure periods are ignored. TF-IDF pattern counts labeled either "normal" or "abnormal" are sent to binary classification block 404. Binary classification 404 predicts whether a time bin is normal or abnormal. As noted above, the present embodiments make use of a LSTM recurrent neural network and GBDT. Each model outputs a probability score which represents the likelihood of the time bin in question being part of a system failure period. This likelihood score is then compared to a threshold value to classify the time bin. Because LSTM and GBDT are two different types of classifier, each representing different aspects of failure prediction, the present embodiments combine the two likelihood scores by, e.g., averaging them to obtain a final probability score. The threshold value can be set by a user or may be set by a supervised or unsupervised training process.

Block 404 thus outputs a list of alerts, each reporting the timestamp and probability that the time bin is in a predictive period. The more alerts in consecutive time bins, the higher the probability of a failure in the near future.

Figure 5:
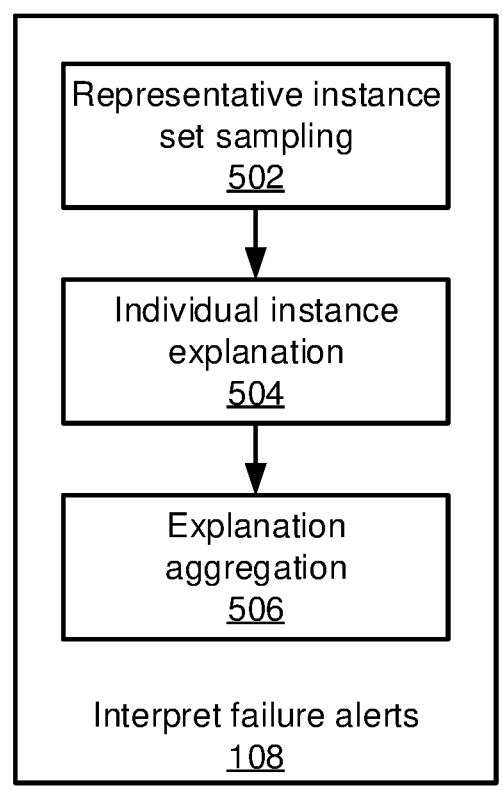
FIG. 5 is a block/flow diagram of a method for interpreting predicted failures by identifying specific parameters associated with a system failure prediction in accordance with an embodiment of the present invention.

Referring now to FIG. 5, additional detail on failure alert interpretation 108 is shown. Failure alert interpretation 108 takes the normal/abnormal labels of the time bins and targets all or a subset of the time bins based on the time range. Block 108 then determines the reason for the prediction with feature weights via a local-faithful surrogate model for every selected time bin and aggregates the explanations to give a general summary and to identify key features.

Representative instance set sampling block 502 selects some samples from normal periods for comparison against abnormal samples. Representative instances can be selected using, for example, a random sampling.

Block 504 then provides an identification of a potential cause for the failure, as will be explained in greater depth below. The instance explanation trains a model based on the representative samples and finds parameters in the trained model that indicate the importance of different log patterns toward the failure prediction.

Explanation aggregation 506 counts the number of occurrences (or sums the weights) of the top positive and negative log patterns to provide the overall interpretation of the failure prediction. System maintenance block 110 uses this information to identify specific system hardware or software components that are likely to be the source of a failure and takes action to mitigate or prevent the failure.

Figure 6:
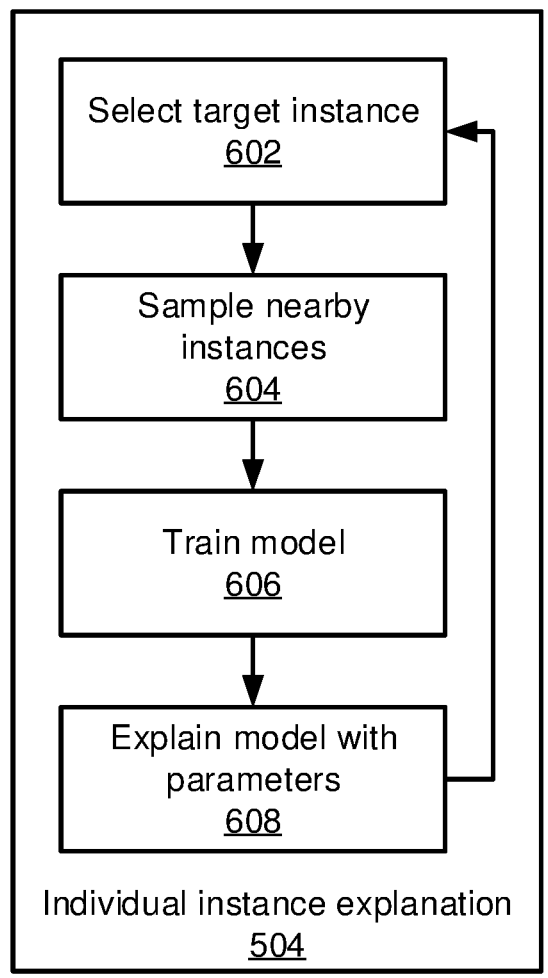
FIG. 6 is a block/flow diagram of a method for identifying specific parameters associated with a system failure prediction in accordance with an embodiment of the present invention.

Referring now to FIG. 6, additional detail on individual instance explanation block 504 is shown. The representative samples are used and a target instance is selected by block 602. Block 604 samples nearby samples and weights those samples by their distance to the target instance. Any appropriate number of samples may be weighted, with an exemplary default being 500. The distance is calculated with a similarity-based distance function.

Block 606 then trains a model on the selected instances and their assigned weights. The present embodiments are described with respect to a sparse L1-regularized linear model, but it should be understood that any appropriate model (e.g., a complex, non-linear model) may be used instead. The L1-regularized linear model is the optimal solution to the following optimization problem:

$$\hat{\beta} = \mathrm{argmin}\left(\frac{1}{n}\sum_{i=1}^{n} (\langle X_i, \beta\rangle - Y_i)^2 + \gamma\|\beta\|_{l_1^d}\right)$$

where $X_i$ is the TF-IDF feature for the $i^{th}$ training log and $Y_i$ is the corresponding prediction, with 1 being system failure and 0 being normal, $\gamma$ is a regularization parameter, $\langle\bullet,\bullet\rangle$ is the Euclidean inner product, and $\|\bullet\|_{l_1^d}$ is the L1 norm of the vector in a d-dimensional Euclidean space. The L1 norm is defined as:

$$\|\beta\|_{l_1^d} = \Sigma_{i=1}^{d}|\beta_i|$$

Each element $\beta_i$ is the weight applied to each dimension of the feature vector. The weight therefore shows the importance of each TF-IDF feature in the prediction of system failures. L1 regularization provides sparsity of the feature so that the most important and dominant feature will be extracted in the explanation of failure prediction.

Block 608 uses the parameters of the trained linear model to explain the importance of different log patterns toward the failure prediction of the target instance. A positive pattern helps to correctly label the time bin, while a negative pattern reduces the prediction correctness. By identifying both positive and negative patterns, the present embodiments can explain whether the prediction is trustworthy and identify the potential cause of failure. This process is repeated for every representative sample.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
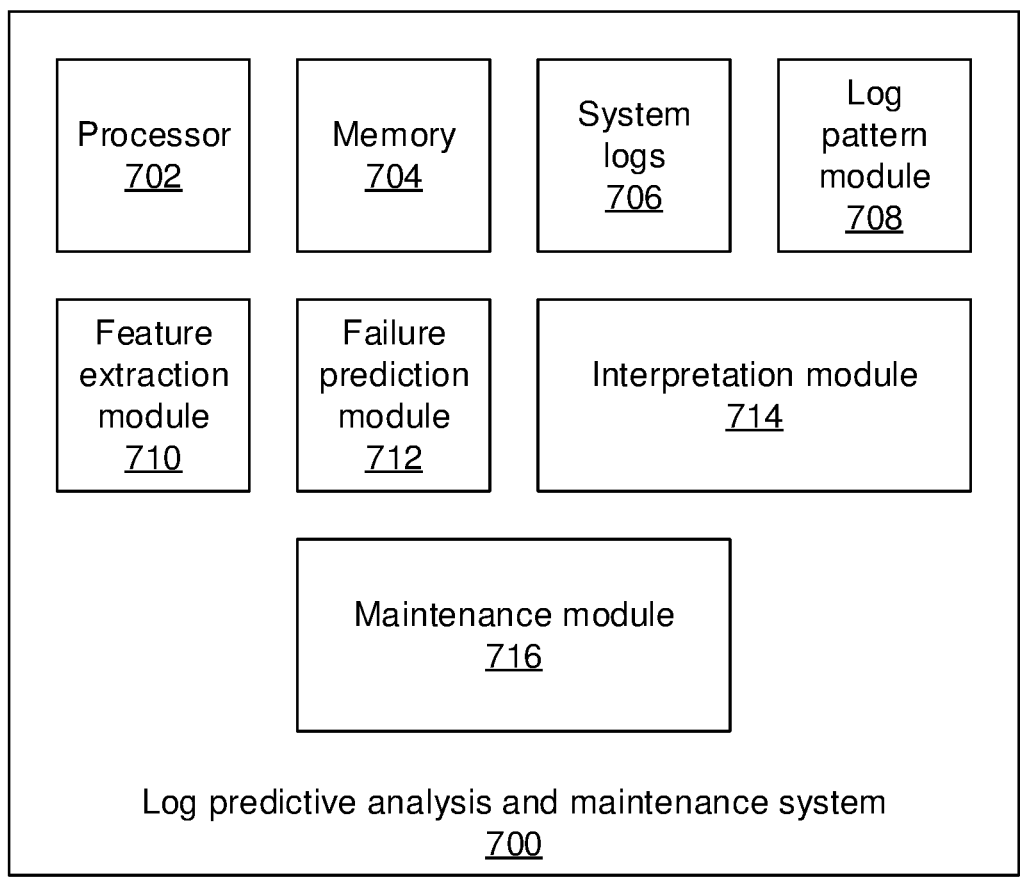
FIG. 7 is a block diagram of a log predictive analysis and maintenance system that performs automated system maintenance based on heterogeneous logs in accordance with an embodiment of the present invention.

Referring now to FIG. 7, a log predictive analysis and maintenance system 700 is shown. The system 700 includes a hardware processor 702 and memory 704. The memory 704 stores, for example, a set of heterogeneous system logs 706 that track the status and performance of a variety of hardware and software components. The logs may track information from hardware and software components that are local to the log predictive analysis and maintenance system or that may, in other embodiments, be received from one or more separate systems. The system 700 furthermore includes one or more functional modules that may, in some embodiments, be implemented in the form of software that is stored in memory 704 and executed by processor 702 or that may, in some alternatives, be implemented in the form of one or more discrete hardware components such as, e.g., application-specific integrated chips or field programmable gate arrays.

A log pattern module 708 identifies a set of log patterns from the system logs 706 and matches each of a set of input logs to corresponding log patterns. Feature extraction module 710 finds a pattern distribution and generates a set of low-dimension features that characterize system status at various times. Failure prediction module 712 uses the extracted features to determine a likelihood of an upcoming system failure and interpretation module 714 identifies one or more causes for predicted failures.

Maintenance module 716 uses the information generated by the interpretation module 714 to take a mitigating or preventative action. This action may include, for example, adjusting an environmental control (e.g., system cooling), shutting down a device at risk for a hardware failure, changing a system security policy (e.g., raising or lowering a security level), alerting a human operator, or any other appropriate action that affects the parameters associated with the predicted system failure. It should be noted that, in embodiments where the system logs 706 are generated at a remote location, the maintenance module 716 can transmit comments to a system at the remote location to effect the action.

Figure 8:
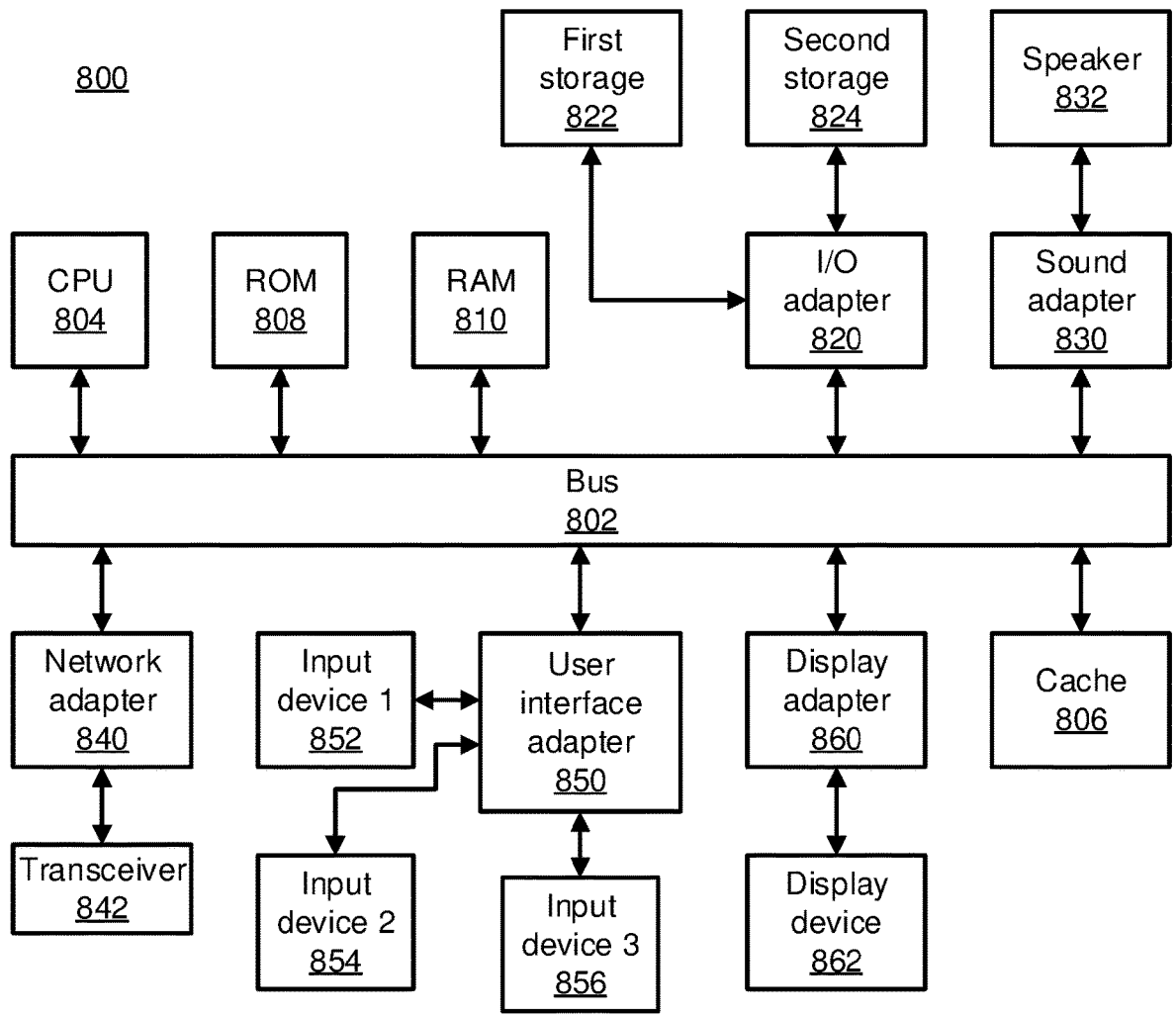
FIG. 8 is a block diagram of an exemplary processing system in accordance with an embodiment of the present invention.

Referring now to FIG. 8, an exemplary processing system 800 is shown which may represent the log predictive analysis and maintenance system 700. The processing system 800 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid-state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for system maintenance, comprising:
   identifying patterns in heterogeneous logs;
   extracting predictive features from a set of input logs based on the identified patterns;
   determining that the predictive features indicate a future system failure using a first model;
   training a second model, based on a target sample from the predictive features and based on weights associated with a distance between the target sample and a plurality of samples from the predictive features, to identify one or more parameters of the second model associated with the future system failure, wherein training the second model includes setting the weights according to an objective function:

$$\mathrm{argmin}\left(\frac{1}{n}\sum_{i=1}^{n}(\langle X_i, \beta\rangle - Y_i)^2 + \gamma \|B\|_{l_1^d}\right)$$

where $X_i$ is a term frequency inverse document frequency (TF-IDF) feature for an $i^{th}$ input log, $Y_i$ is a corresponding prediction, $\gamma$ is a regularization parameter, n is a number of input logs, $\beta$ is a vector of the weights, and $\|\beta\|_{l_1^d}$ is an L1 norm of $\beta$ in a d-dimensional Euclidean space; and
   performing a system maintenance action in accordance with the identified one or more parameters.

2. The method of claim 1, wherein the first model is a combination of a long-short-term memory recurrent neural network and a gradient-boosting decision tree.

3. The method of claim 2, wherein determining that the predictive features indicate a future system failure comprises generating a first failure likelihood from the long-short-term memory recurrent neural network and a second failure likelihood from the gradient-boosting decision tree.

4. The method of claim 3, wherein determining that the predictive features indicate a future system failure further comprises averaging the first failure likelihood and the second failure likelihood to generate a combined failure likelihood and comparing the combined failure likelihood to a failure prediction threshold.

5. The method of claim 1, wherein the second model is a sparse L1-regularized linear model.

6. The method of claim 1, wherein identifying patterns in heterogeneous logs comprises clustering the heterogeneous logs according to similarity.

7. The method of claim 1, wherein extracting predictive features comprises converting pattern distribution features according to Term-Frequency Inverse-Document-Frequency (TF-IDF).

8. The method of claim 7, wherein extracting predictive features comprises further reducing dimensionality of the converted pattern distribution features.

9. The method of claim 1, wherein performing the system maintenance action comprises performing an action selected from the group consisting of adjusting an environmental control, shutting down a device at risk for a hardware failure, and changing a system security policy.

10. A method for system maintenance, comprising:
    identifying patterns in heterogeneous logs by clustering the heterogeneous logs according to similarity;
    extracting predictive features from a set of input logs based on the identified patterns by converting pattern distribution features according to Term-Frequency Inverse-Document-Frequency (TF-IDF);
    determining that the predictive features indicate a future system failure using a first model that averages an output of two distinct machine learning models;
    training a second model, based on a target sample from the predictive features and based on weights associated with a distance between the target sample and a plurality of samples from the predictive features, to identify one or more parameters of the second model associated with the future system failure, wherein training the second model includes setting the weights according to an objective function:

$$\mathrm{argmin}\left(\frac{1}{n}\sum_{i=1}^{n}(\langle X_i, \beta\rangle - Y_i)^2 + \gamma \|B\|_{l_1^d}\right)$$

where $X_i$ is a term frequency inverse document frequency (TF-IDF) feature for an $i^{th}$ input log, $Y_i$ is a corresponding prediction, $\gamma$ is a regularization parameter, n is a number of input logs, $\beta$ is a vector of the weights, and $\|\beta\|_{l_1^d}$ is an L1 norm of $\beta$ in a d-dimensional Euclidean space; and
    performing a system maintenance action in accordance with the identified one or more parameters.

11. The method of claim 10, wherein performing the system maintenance action comprises performing an action selected from the group consisting of adjusting an environmental control, shutting down a device at risk for a hardware failure, and changing a system security policy.

12. A system for system maintenance, comprising:
    a log pattern module configured to identify patterns in heterogeneous logs;
    a feature extraction module configured to extract predictive features from a set of input logs based on the identified patterns;
    a failure prediction module configured to determine that the predictive features indicate a future system failure using a first model;
    an interpretation module configured to train a second model, based on a target sample from the predictive features and based on weights associated with a distance between the target sample and a plurality of samples from the predictive features, to identify one or more parameters of the second model associated with the future system failure, wherein the interpretation module trains the second model by setting the weights according to an objective function:

$$\operatorname{argmin}\left(\frac{1}{n}\sum_{i=1}^{n}(\langle X_i, \beta\rangle - Y_i)^2 + \gamma\|B\|_{l_1^d}\right)$$

where $X_i$ is a term frequency inverse document frequency (TF-IDF) feature for an $i^{th}$ input log, $Y_i$ is a corresponding prediction, $\gamma$ is a regularization parameter, n is a number of input logs, $\beta$ is a vector of the weights, and $\|\beta\|_{l_1^d}$ is an L1 norm of $\beta$ in a d-dimensional Euclidean space; and a maintenance module configured to perform a system maintenance action in accordance with the identified one or more parameters.

13. The system of claim 12, wherein the first model is a combination of a long-short-term memory recurrent neural network and a gradient-boosting decision tree.

14. The system of claim 13, wherein the failure prediction module is further configured to generate a first failure likelihood from the long-short-term memory recurrent neural network and a second failure likelihood from the gradient-boosting decision tree.

15. The system of claim 14, wherein the failure prediction module is further configured to average the first failure likelihood and the second failure likelihood to generate a combined failure likelihood and to compare the combined failure likelihood to a failure prediction threshold.

16. The system of claim 12, wherein the second model is a sparse L1-regularized linear model.

17. The system of claim 12, the log pattern module is further configured to cluster the heterogeneous logs according to similarity.

18. The system of claim 12, wherein the feature extraction module is further configured to convert pattern distribution features according to Term-Frequency Inverse-Document-Frequency (TF-IDF).

19. The system of claim 18, wherein the feature extraction module is further configured to reduce dimensionality of the converted pattern distribution features.

20. The system of claim 12, wherein the maintenance module is further configured to perform an action selected from the group consisting of adjusting an environmental control, shutting down a device at risk for a hardware failure, and changing a system security policy.

* * * * *